United States Patent [19]

Weems et al.

[11] Patent Number: 5,577,082
[45] Date of Patent: *Nov. 19, 1996

[54] REPAIRED SHROUD ASSEMBLY FOR A BOILING WATER REACTOR

[75] Inventors: Sterling J. Weems, Chevy Chase, Md.; Noman Cole, Mason Neck, Va.

[73] Assignee: MPR Associates, Inc., Alexandria, Va.

[*] Notice: The term of this patent shall not extend beyond the expiration date of Pat. No. 5,402,570.

[21] Appl. No.: 516,716

[22] Filed: Aug. 18, 1995

Related U.S. Application Data

[63] Continuation of Ser. No. 334,361, Nov. 3, 1994, abandoned, which is a continuation of Ser. No. 190,796, Feb. 2, 1994, Pat. No. 5,402,570.

[51] Int. Cl.⁶ ..................................................... G21C 15/00
[52] U.S. Cl. .............................................................. 376/302
[58] Field of Search .................................... 376/260, 285, 376/287, 302, 303, 304, 461

[56] References Cited

U.S. PATENT DOCUMENTS

| | | |
|---|---|---|
| 2,929,236 | 3/1960 | Steward et al. . |
| 3,011,962 | 12/1961 | Koch et al. . |
| 3,116,214 | 12/1963 | Greenstreet . |
| 3,215,608 | 11/1965 | Guenther . |
| 3,445,971 | 5/1969 | Desmarchais et al. . |
| 3,627,634 | 12/1971 | Guenther et al. . |
| 3,719,555 | 3/1973 | Davis . |
| 3,720,581 | 3/1973 | Kaser . |
| 3,733,760 | 5/1973 | Koerner . |
| 3,744,660 | 7/1973 | Gaines et al. . |
| 3,785,924 | 1/1974 | Notari ................................... 376/302 |
| 3,850,795 | 11/1974 | Thome . |
| 3,910,447 | 10/1975 | Bevilacqua . |
| 3,926,722 | 12/1975 | Dupen . |
| 3,994,776 | 11/1976 | Keller . |
| 4,011,132 | 3/1977 | Kumpf et al. . |

(List continued on next page.)

FOREIGN PATENT DOCUMENTS

| | | |
|---|---|---|
| 2107382 | 5/1972 | France . |
| 1958152 | 8/1970 | Germany . |
| 2024630 | 1/1971 | Germany . |
| 2361416 | 5/1975 | Germany . |
| 2643011 | 3/1978 | Germany . |
| 257958 | 7/1988 | Germany . |
| 1787095 | 1/1993 | U.S.S.R. . |
| 1271594 | 4/1972 | United Kingdom . |

OTHER PUBLICATIONS

J. S. Abel et al, "Applicability of Pipelocks as a Remedy for Intergranular Stress Corrosion Cracking in BWRs," Int. J. Pres. Ves. & Piping 25, pp. 25–46 (1986).

J. S. Abel et al, "Mechanical Methods of Improving Resistance to Stress Corrosion Cracking in BWR Piping Systems," Int. J. Pres. Ves. & Piping 34, pp. 17–29 (1988).

Consumers Power Company, "Report of Operation of Big Rock Point Nuclear Plant," Docket No. 50–155, Forty Pages (Nov. 30, 1964).

(List continued on next page.)

Primary Examiner—Daniel D. Wasil

[57] ABSTRACT

A method of repairing nuclear reactor core shrouds having horizontal cracks in heat affected zones of welds includes applying vertical compressive forces to the shroud in situ to urge opposed surfaces of the cracks toward one another. A plurality of tie rods, angularly spaced about the shroud periphery, is used to selectively apply the longitudinally compressive forces. Preferably, the method utilizes existing hardware secured to the shroud for attaching the tie rods thereto. The tie rods may be used in communication with horizontal and/or vertical spacers inserted between the shroud and the reactor vessel. Horizontal spacers serve to resist horizontal seismic loads and hold the shroud in place in spite of cracking. Vertical spacers resist vertically upward loads resulting from main steam line breaks.

6 Claims, 8 Drawing Sheets

U.S. PATENT DOCUMENTS

| | | |
|---|---|---|
| 4,053,080 | 10/1977 | Daublebsky . |
| 4,057,162 | 11/1977 | Gross . |
| 4,073,685 | 2/1978 | Brown et al. . |
| 4,092,215 | 5/1978 | Mutzl . |
| 4,111,327 | 9/1978 | Janakiev . |
| 4,165,021 | 8/1979 | Dorling . |
| 4,192,718 | 3/1980 | Janakiev . |
| 4,199,403 | 4/1980 | Puri et al. . |
| 4,199,994 | 4/1980 | Beine et al. . |
| 4,223,797 | 9/1980 | Skakunov . |
| 4,265,010 | 5/1981 | Doss et al. . |
| 4,285,503 | 8/1981 | Calhoun et al. . |
| 4,299,658 | 11/1981 | Meuschke et al. . |
| 4,322,880 | 4/1982 | Lampe . |
| 4,379,119 | 4/1983 | Fujimoto . |
| 4,409,179 | 10/1983 | Burger . |
| 4,562,332 | 12/1985 | Walter et al. . |
| 4,585,091 | 4/1986 | Budd . |
| 4,596,689 | 6/1986 | Gorholt et al. . |
| 4,652,426 | 3/1987 | Boyle et al. . |
| 4,789,520 | 12/1988 | Morimoto et al. . |
| 5,257,295 | 10/1993 | Chevereau et al. ............... 376/302 |
| 5,274,683 | 12/1993 | Broda et al. . |
| 5,319,692 | 6/1994 | Hopkins et al. . |
| 5,392,322 | 2/1995 | Whitling et al. ............... 376/302 |
| 5,402,570 | 4/1995 | Weems et al. ............... 376/302 |
| 5,430,779 | 7/1995 | Baversten et al. . |

OTHER PUBLICATIONS

Consumers Power Company, "Report of Operation of Big Rock Point Nuclear Plant," Docket No. 50–155, Six Pages (Dec. 30, 1965).

J. E. Corr, "Big Rock Point Nuclear Plant Thermal Shield Instability, Part 1, Redesign and Test Programs," General Electric, San Jose, California, Seventy–Three Pages (Nov. 3, 1966).

BWR Owner's Group, "Recommendations on Inservice Inspection of BWR Internal Components and Attachments," Presented to ASME Section XI Subcommittee on Nuclear Inservice Inspection, 29 Pages (Apr. 1991).

Baltimore Gas and Electric, "Updated Final Safety Analysis Report–Calvert Cliffs Nuclear Power Plant," Forty–Five Pages (Jul. 20, 1982).

Illustrations of Haddam Neck Nuclear Plant, Figs. 5.3–4 and 04.2–10 (Mar. 1991 and Jun. 1994).

Illustrations of Hatch Nuclear Plant, Fig. 3.3–1, Fig. 4.1–1, Fig. 4.2–9 & Fig. 4.1–4.

Kewaunee Reactor Vessel Schematic, Fig. 3.2–21 and Fig. 4.2–2, Three Pages (Jul. 1, 1986).

Letter from Nuclear Regulatory Commission to Hatch dated Sep. 30, 1994, Thirteen Pages.

Hatch submittal to Nuclear Regulatory Commission dated Sep. 2, 1994, Nineteen Pages.

Illustration of Indian Point Unit 2, Figs. 2–1, 2–9, 3.2–47 and 3.2–51, Six Pages.

Illustration of Maine Yankee Atomic Power Station, Fig. 3.3–1, One Page.

U.S. Nuclear Regulatory Commission, "Millstone Final Safety Analysis Report," Aug. 10, 1972, 54 Pages.

Handouts from NRC Meeting with Hatch/GE on September 14, 1994, 211 Pages.

Illustration of Palo Verde Reactor Vertical Arrangement, Fig. 4.1–1, Mar. 1991, One Page.

Illustration of R. E. Ginna Reactor Vessel Internals, Fig. 3.9–9 and 3.9–10, Two Pages.

Florida Power & Light Company, "Final Safety Analysis Report–vol. 1, St. Lucie Plant," Feb. 28, 1973, Eighty–four Pages.

Illustration from Shearon Harris Nuclear Power Plant, Carolina Power & Light Company, Final Safety Analysis Report, Fig. 3.9.2–1, Two Pages.

Yankee Atomic Electric Company, Yankee Rowe Proposal, Oct. 15, 1965, Twenty–Five Pages.

REPAIRED SHROUD ASSEMBLY FOR A BOILING WATER REACTOR

This application is a continuation of patent application Ser. No. 08/334,361, filed Nov. 3, 1994, now abandoned, which is a continuation application of patent application Ser. No. 08/190,796, filed Feb. 2, 1994, now U.S. Pat. No. 5,402,570.

BACKGROUND OF THE INVENTION

1. Technical Field

The present invention relates to methods for repairing nuclear reactor core shrouds. In particular, the method of the present invention is concerned with repair of boiling water reactor shrouds in order to allow safe reactor operation even with extensive cracking along heat affected zones of horizontal welds.

2. Discussion of the Prior Art

Boiling water reactor shrouds are disposed concentrically within the reactor vessel and are commonly formed from multiple arcuate steel plates having a thickness on the order of one and one-half inches. Plates at each horizontal level of the shroud are joined by welds along abutting, relatively short, vertical edges to encircle the reactor at that level. The plates at different adjacent levels are joined along their abutting, relatively long, arcuate edges with horizontal welds. After periods of use, cracking of the shroud tends to occur within heat affected zones of the welds as a result of corrosion, radiation and stress. Cracking of the vertically oriented welds is considered acceptable because these welds are relatively short in length, relative to the overall shroud length, and do not adversely affect the function of the shroud (i.e., support and alignment of the nuclear fuel assemblies, and channeling of reactor coolant flow). Specifically, vertical welds at adjacent levels are offset angularly about the shroud periphery so that cracking of such a weld crank extend, at most, only the axial or vertical length of that level. However, if cracking occurs along the longer horizontal or circumferential welds, a crack can extend along the entire circumference or periphery of the shroud, permitting relative lateral movement between the plate levels. Such excessive cracking, therefore, could prevent the core from supporting and aligning the fuel assemblies, can improperly direct or impede coolant flow, and may permit coolant flow leakage.

When excessive horizontal weld cracking occurs, the shroud must either be replaced or repaired. Repair is certainly the preferred alternative in view of the fact that replacement involves significant expense, relatively long shut down time, and the potential for radiation exposure to personnel. To date, however, there has been no acceptable method of shroud repair in situ. Repair techniques used to date typically involve bolting brackets onto vertically adjacent plates across a weld crack. This approach requires plural brackets for each crack, depending upon the length of the crack. Moreover, welds must be separately inspected after repair for additional cracking of the repaired welds as well as for new cracks in other welds.

OBJECTS AND SUMMARY OF THE INVENTION

It is therefore an object of the present invention to provide a method for repairing in situ nuclear reactor shrouds of the type having multiple levels of arcuate plates welded together, the method permitting safe reactor operation even with excessive cracking of horizontal welds.

It is also an object of the present invention to provide such method in an already operational reactor where the repair method is relatively inexpensive, reactor shut-down time is minimal during the repair procedure, and radiation exposure is negligible for repair personnel.

It is also an object of the present invention to provide a method for repairing previously operational reactor shrouds having cracks along heat affected zones of horizontal welds, said method being accomplished without using structures that significantly impedes coolant flow in the annular space between the shroud and the vessel.

A further object of the present invention is to provide a method for repairing a horizontally cracked reactor shroud in a manner that substantially diminishes the need for subsequent inspection for weld cracks.

In accordance with the present invention, a method for repairing an already operational reactor shroud of the type described involves inspecting the shroud for horizontal cracking along welds and securing plural tie rods in vertical orientation spaced about the periphery of the cracked shroud to axially compress the shroud and thereby urge the opposing surfaces of a horizontal crack toward one another. Alternatively or in addition, spacers may be compressibly installed between the outer wall of the shroud and the inner wall of the reactor vessel at different longitudinally spaced and angularly spaced locations. In a preferred embodiment the tie rods and spacers are both installed to provide maximum protection against relative transverse movement between the shroud levels along horizontal cracks.

The method of the present invention repairs existing horizontal weld cracks and permits continued operation in spite of subsequently occurring horizontal weld cracks by applying the axially compressive force on the shroud assembly with the tie rods, and by continuously providing radially exerted stabilizing forces with the spacers.

The foregoing and other objects, features and many of the attendant advantages of the present invention will be appreciated more readily as they become better understood from reading the following description considered in connection with the accompanying drawings wherein like parts in each of the several figures are identified by the same reference characters.

DESCRIPTION OF THE PREFERRED EMBODIMENTS

Figure 1:
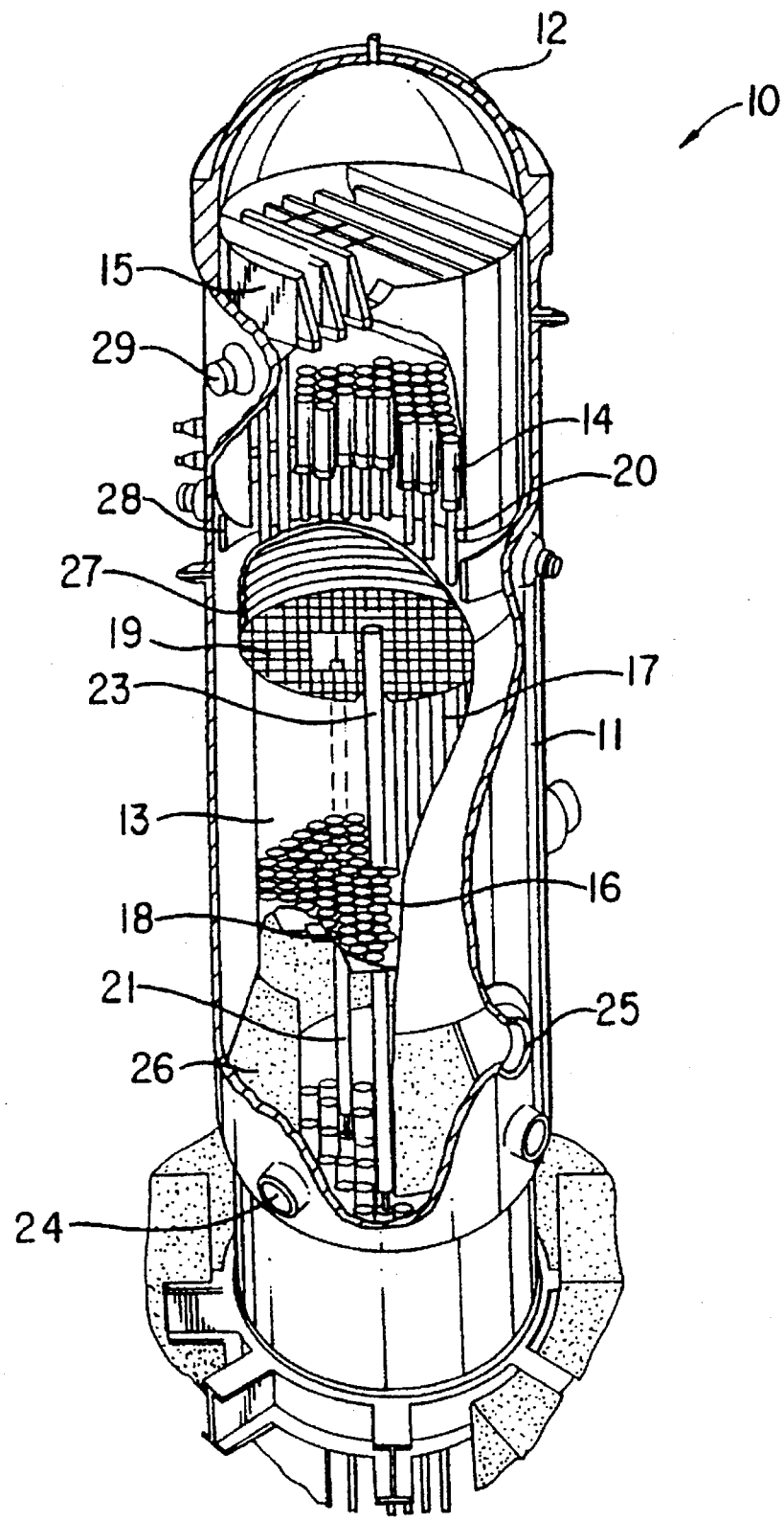
FIG. 1 is a cut away view in perspective of a boiling water reactor exemplifying a type of reactor suitable for repair by the method of the present invention.

In order to provide a point of reference for understanding the repair method of the present invention, a boiling water nuclear reactor assembly 10 is illustrated in cut-away in FIG. 1. In view of the fact that the invention relates to repairing the reactor shroud and not to the operation of the reactor itself, no attempt is made herein to provide a detailed description of reactor operation. Such operation is adequately described in numerous publications and patents, for example U.S. Pat. Nos. 3,627,634 (Guenther et al) and 4,789,520 (Morimoto et al), among others.

Reactor assembly 10 includes a pressure vessel 11 tightly sealed by a lid 12 at the vessel top. Reactor core shroud 13 is mounted inside vessel 11. A steam separator 14 is mounted on a steam plenum head 20 on top of the shroud 13, and a steam drying assembly 15 is disposed above the steam separator. A lower reactor core support plate 16 disposed within shroud 13 supports a fuel assembly 17, also disposed within the shroud. Lower core grid 18 and upper core grid 19 are positioned below and above, respectively fuel assembly 17.

Control rod guide tubes 21 are provided within vessel 11 at locations above a control rod driving mechanism (not shown) located at the bottom of the vessel beneath shroud 13. The lower ends of corresponding control rods 23 are detachably connected to the driving mechanism and are arranged to move up and down within guide tubes 21.

Recirculated water is delivered into vessel 11 via one or more inlet ports 24, and egresses via one or more outlet ports 25. Also illustrated is a diffuser 26, a core sparger 27 and a feed water sparger 28. One or more steam outlets 29 communicates between the interior and exterior of vessel 11 at a location above the shroud and the steam separator.

Shroud 13 is typically made up of multiple levels, each comprising plural arcuate Type 304 steel plates having a thickness on the order of one and one-half inches and welded together at their abutting edges. To better understand this welded structure, reference is now made to FIG. 2 wherein the plates are shown in flattened projection adjacent a 360° scale provided for angular orientation reference. The plates are oriented with their long or arcuate dimensions disposed horizontally, their width dimensions disposed vertically and their thickness dimensions disposed radially or into the plane of the drawing in FIG. 2.

Figure 2:
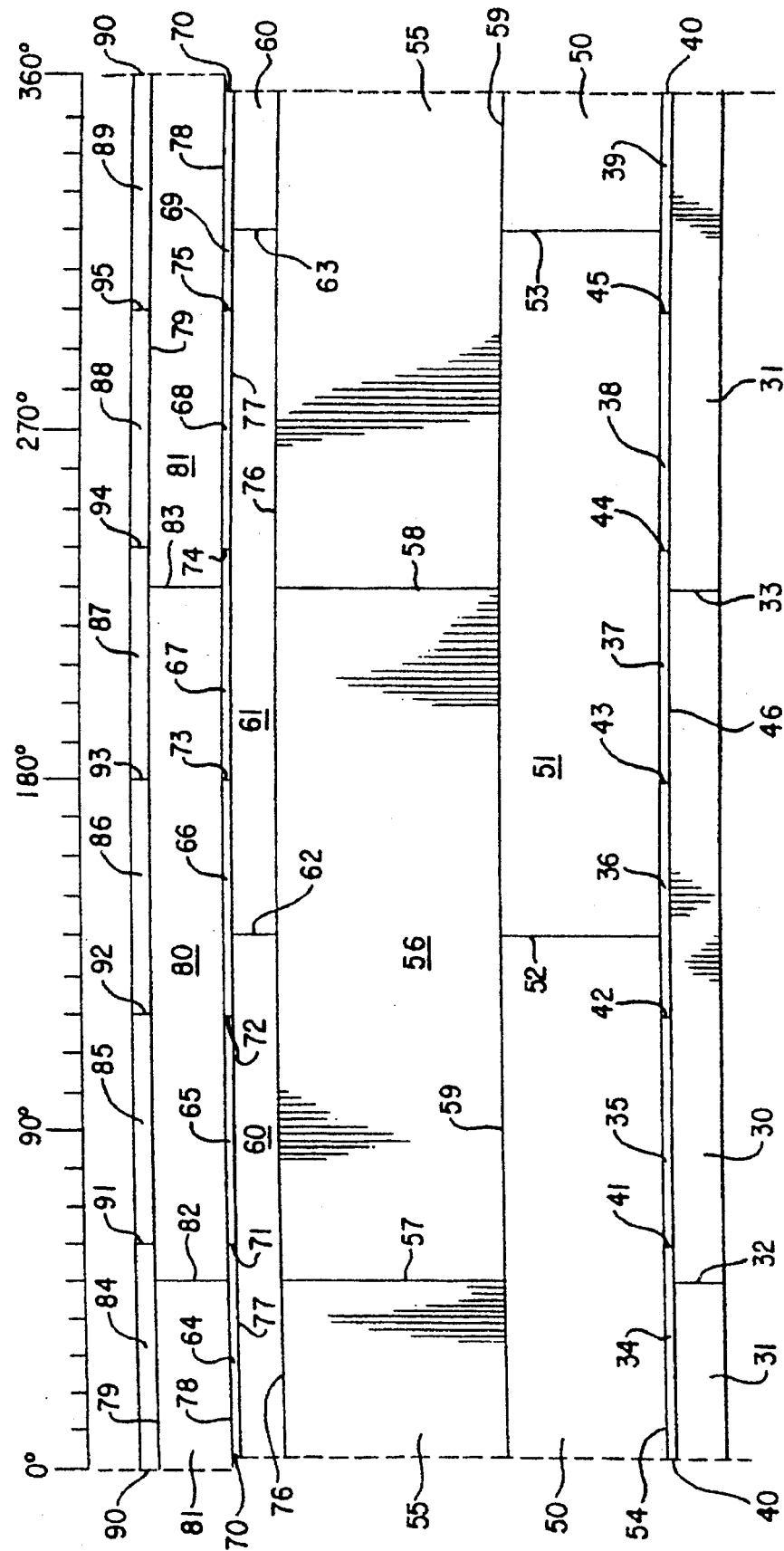
FIG. 2 is a flattened projection of a cylindrical core shroud in the reactor of FIG. 1.

The particular shroud illustrated in FIG. 2 includes eight horizontal annular levels of plates, the plates at any level being of the same width (or height), with the height varying from level to level. The thickness or depth of the plates is the same for every level. As illustrated, the bottom annular level is made up of two plates 30, 31, each 180° in circumferential length, disposed end to end and welded together at their abutting ends to form vertical welds 32 and 33. The second level from the bottom is made up of six plates, 34, 35, 36, 37, 38, 39, each 60° in circumferential length, also welded together at abutting ends to form vertical welds 40, 41, 42, 43, 44 and 45. The bottom edges of plates 34 through 39 are welded to the abutting top edges of plates 30, 31 to provide a circumferentially continuous horizontal weld 46. The vertical welds 32 and 33 between plates 30 and 31 are angularly offset from vertical welds 40 through 45 so that vertical welds in adjacent levels are not in angular or longitudinal alignment. It is also noted that the plates 34 through 39 in the second level are significantly narrower (i.e., smaller in vertical height) than plates 30, 31 in the bottom level.

The third lowest level includes two 180° plates 50, 51 disposed end to end and welded together at their abutting ends to form vertical welds 52, 53. The bottom edges of plates 50, 51 are welded to the top edges of plates 34 through 39 to provide a circumferentially continuous horizontal weld 54. Vertical welds 52, 53 are angularly offset from vertical welds 40 through 45 and from welds 32, 33. Plates 50, 51 are wider (i.e., larger in the vertical dimension) than plates 30, 31 and plates 34 through 40.

The fourth annular level of shroud plates includes two 180° plates 55, 56 having their ends welded together at welds 57, 58. Vertical welds 57, 58 are angularly offset from vertical welds 52, 53 and from welds 40 through 45; however, welds 57, 58 are vertically aligned with welds 32, 33, respectively. Plates 57, 58 are wider than the plates in all other levels of the shroud. The bottom edges of plates 55, 56 are welded to the top edges of plates 50, 51 to form a circumferentially continuous horizontal weld 59.

In a like manner, successively higher annular levels of the shroud includes two 180° plates 60, 61 at level five, six 60° plates 64, 65, 66, 67, 68, 69 at level six, two 180° plates 80, 81 at level seven, and six 60° plates 84, 85, 86, 87, 88, 89 at level eight. Level five has vertical welds 62, 63; level six has vertical welds 70, 71, 72, 73, 74 and 75; level seven has vertical welds 82, 83; and level eight has vertical welds 90, 91, 92, 93, 94, 95. Circumferentially continuous horizontal welds 76, 77, 78 and 79 are provided between levels four and five, levels five and six, levels six and seven and levels seven and eight, respectively. The widths or heights of level five, six, seven and eight are all different, each being smaller than the widths of levels three and four.

No vertical welds in any shroud level are aligned with vertical welds in an adjacent shroud level. Accordingly, a crack in a heat affected zone of any vertical weld cannot extend beyond one shroud level, and such cracks are typically ignored. On the other hand, horizontal welds 46, 54, 59, 76, 77, 78 and 79 are circumferentially continuous. A crack in the heat affected zone in one of these horizontal welds, therefore, could ultimately extend about the entire circumference of the shroud. It will be appreciated that circumferential cracks could result in significant relative horizontal movement between shroud levels in response to seismic events and other vibrations. This would adversely affect the support and alignment of nuclear fuel assemblies disposed within the shroud. Likewise, coolant flow through the reactor would be adversely affected.

The repair method of the present invention is performed upon the first indication of cracking in the heat affected zones of horizontal welds in a reactor core shroud of the type described. Specifically, if horizontal cracking is noticed during a periodic inspection of the shroud, the shroud can be repaired in the manner described below. The repair method involves installing tie rods and/or horizontal spacers and/or vertical spacers on the shroud in situ while the reaction is shut down. Installation of the tie rods uses existing structure in the reactor whenever possible, but may require additional hardware. The tie rods are spaced about the shroud periphery in the annular space between the shroud and the reactor vessel. A particular shroud structure is shown in FIGS. 3, 4 and 5 to illustrate an exemplar tie rod repair installation.

Figure 3:
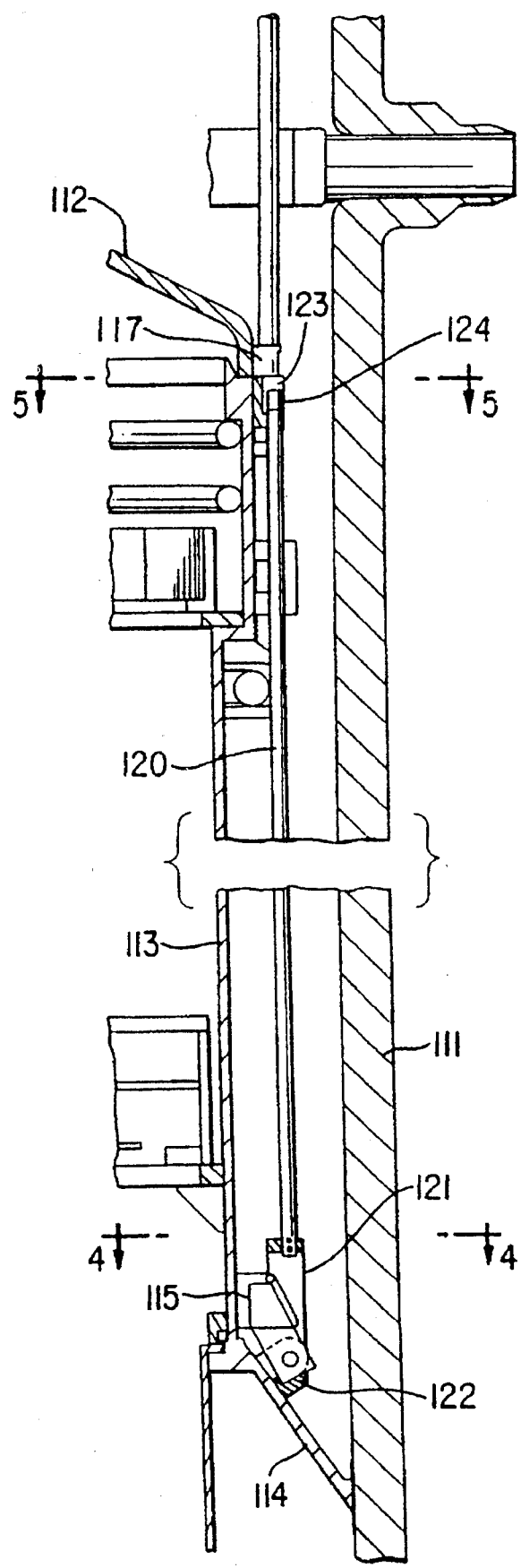
FIG. 3 is a detailed view in broken longitudinal section of a portion of a reactor shroud repaired according to the present invention.
Figure 4:
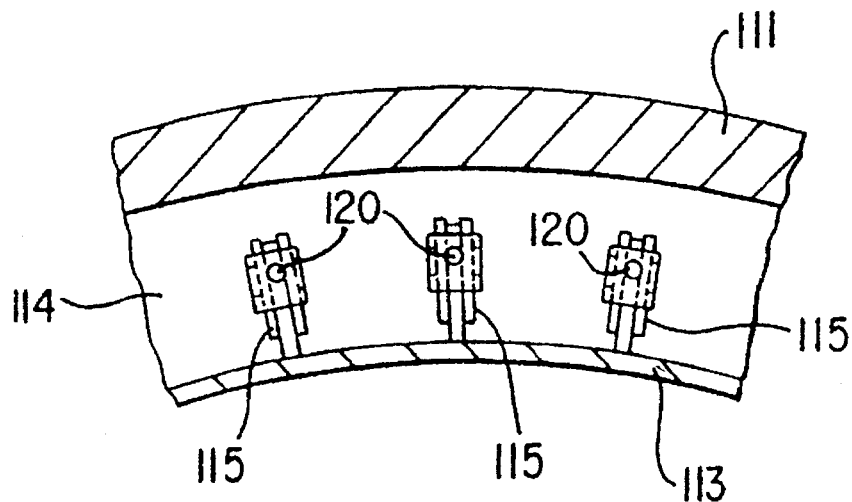
FIG. 4 is a view in section taken along lines 4—4 of FIG. 3.
Figure 5:
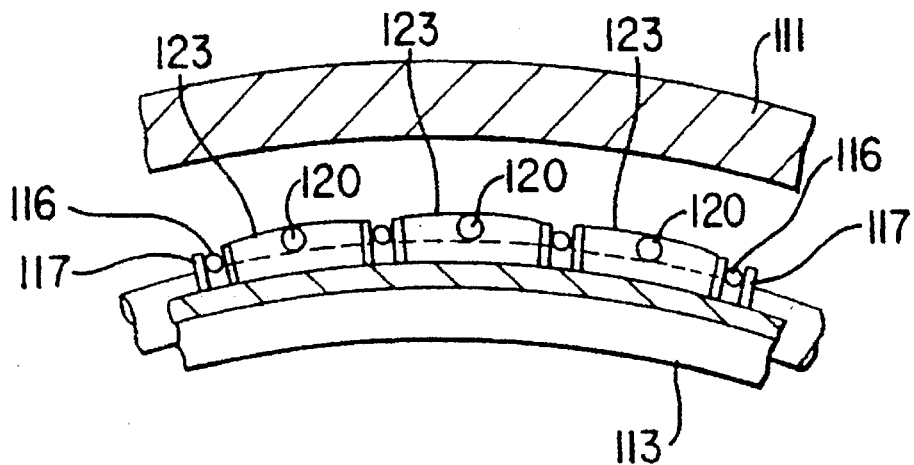
FIG. 5 is a view in section taken along lines 5—5 of FIG. 3.

Referring to FIGS. 3, 4 and 5, shroud 113 has a frustoconical support structure 114 diverging from its bottom to abut the interior surface of reactor vessel 111. Support structure 114 is welded to the vessel wall at the annular abutment location. The upper edge of the support structure may be formed integrally with or welded to the bottom annular edge of shroud 113. A plurality of brackets 115 are secured by welding or the like to the outside of the shroud cylinder near its bottom, and to support structure 114 to provide additional strength for the junction of the support structure and the shroud. Brackets 115 are spaced at regular angular intervals about the periphery of shroud 113. As shown, the lowermost part of bracket 115, extending along the support structure 114, is radially spaced from the wall of vessel 111. The shroud sealing lid 112 is secured to the top of shroud 113 by means of bolts 116 threadedly or otherwise engaged by lugs 117 secured in angularly spaced relation to the shroud periphery adjacent the upper edge of the shroud. It is to be noted that, for purposes of convenience, the arcuate plates making up the different shroud levels are not individually illustrated in these drawings; it is to be understood, however, that the shroud structure comprises a plurality of horizontal levels of plates of the type described above in relation to FIG. 2. The structure thus far described is part of the original reactor assembly and is not added as part of the repair method.

The tie rods 120 employed to repair the shroud are engaged by using the existing brackets 115 and lugs 117. Specifically, the bottom of each tie rod 120 has a hook or similar engagement member 121 secured at its bottom end. Engagement member 121 is configured to permit a portion 122 thereof to engage a bracket 115 from the underside of that bracket to prevent upward axial movement of the tie rod. It will be appreciated that, for reactors wherein brackets 115 are not provided, suitable holes may be formed in support structure 114 to receive and threadedly (or otherwise) engage the bottoms of tie rods 120. Under such circumstances, of course, engagement member 121 is not reinforced. Holes for this purpose may be formed by drilling, EDM techniques, etc.

At their upper ends, tie rods 120 are secured to respective metal beams 123 installed during the repair procedure atop the existing lugs 117. In particular, each beam 123 is supported between a respective pair of angularly spaced lugs 117 and is secured to the lugs by any suitable means, such as by adhesive, screws, etc. A hole is defined vertically through each beam 123 and is configured to receive a respective tie rod 120 extending therethrough. Each tie rod 120 may be axially tightened by a respective nut 124 threadedly engaging its upper end and bearing against beam 123. When nuts 124 are tightened, hooks 121 are pulled upward such that portions 122 exert upward forces against brackets 115. Corresponding downward forces are exerted by the nuts on the beams 123, resulting in axial or longitudinal compression of the entire shroud by the multiple, angularly spaced tie rods. This longitudinal compression urges the opposing surfaces of horizontal cracks toward one another, thereby sealing the cracks and preventing their adverse effects on the shroud structure. Moreover, horizontal cracking occurring subsequent to the repair procedure is rendered similarly ineffectual by the axial compression continuously applied by the tie rods.

Figure 6:
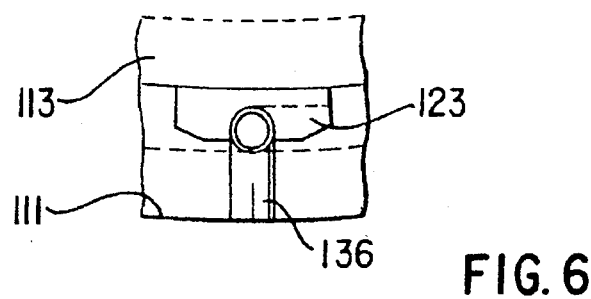
FIG. 6 is a top view in plan of a tie rod assembly employed in one embodiment of the method of the present invention.
Figure 7:
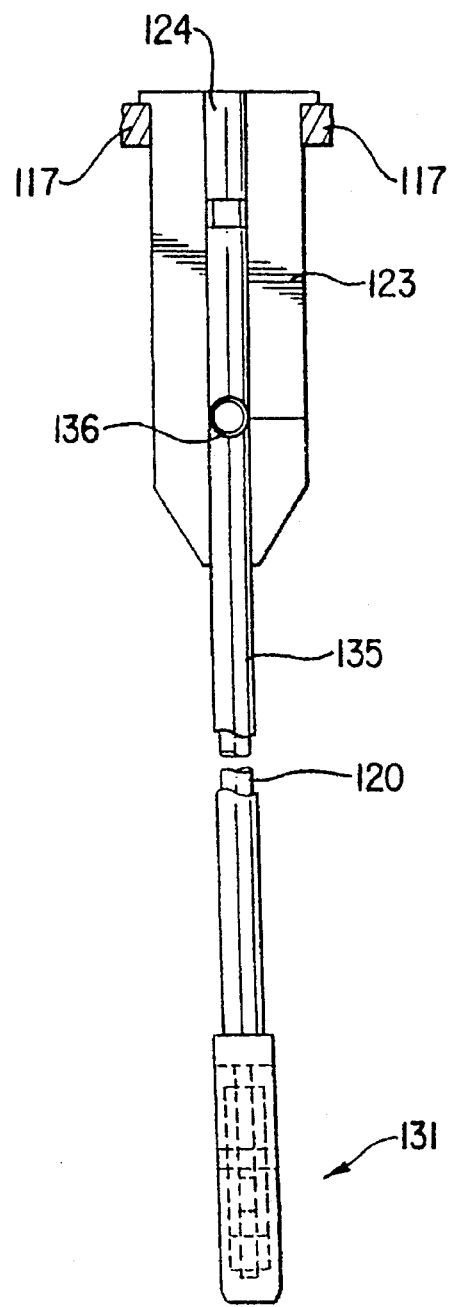
FIG. 7 is a front view in broken elevation of the tie rod assembly of FIG. 6.
Figure 8:
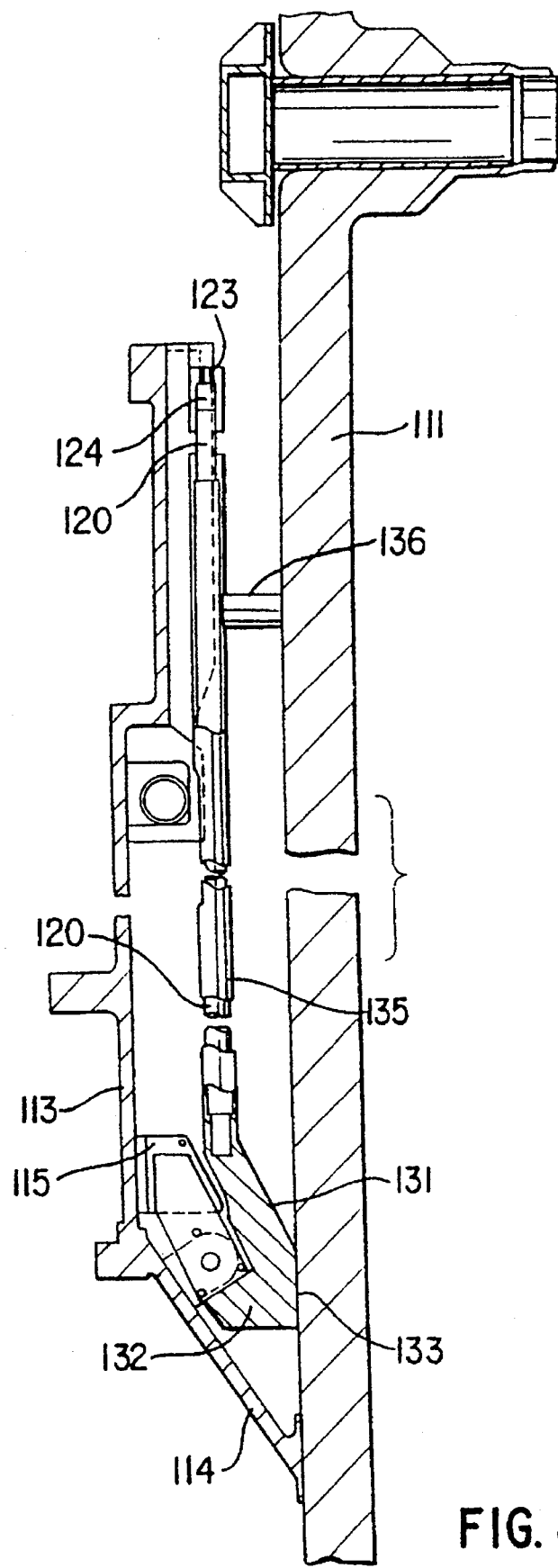
FIG. 8 is a detailed view in longitudinal section of a portion of a reactor shroud repaired using the tie rod assembly of FIG. 6.

An alternative tie rod assembly and mounting arrangement is illustrated in FIGS. 6, 7 and 8 to which reference is now made. The engagement member 131 secured to the bottom of the tie rod assembly has its bottom portion 132 formed with a radially outward facing surface 133 contoured and arranged to abut the interior wall of reactor vessel 111 in flush relation when the engagement member is deployed in engagement with bracket 115. Also, the surface of portion 132 that engages bracket 115 is positioned at an angle close to perpendicular to shroud support 114 during deployment. Accordingly, when the tie rod is tightened, a lateral force component is applied to member 131 to urge its surface 133 radially outward against the wall of vessel 111. The result is lateral support for the shroud in addition to the longitudinal compression applied by the tie rods.

Another difference in the tie rod assembly of FIGS. 6, 7 and 8 is the presence of an outer tube 135 disposed concentrically about tie rod 120 with a small radial clearance. The bottom of tube 135 is fixedly secured to the top of engagement member 131. The upper end of tube 135 terminates somewhat below the top of tie rod 120 so as to be spaced somewhat below beam 123 when the tie rod is deployed. A spacer 136 takes the form of a tubular projection extending radially from tube 135 in the same angular direction as surface 133 of engagement member 131. Spacer 136 is located near the upper end of tube 135. The length of spacer 136 is selected such that it bears axially against the interior surface of vessel 111 when the tie rod is deployed.

Deployment of the tie rod assembly of FIGS. 6, 7 and 8 involves lowering the assembly vertically downward between the shroud and vessel in an orientation where it is rotated 90° relative to its final deployment orientation. This permits engagement member 131 and spacer 136 to be freely moved longitudinally until the assembly is at its proper vertical position. The assembly is then rotated 90° about the tie rod axis whereupon engagement member 131 engages bracket 115, and surface 133 and spacer 136 bear radially against the vessel wall.

Although beams 123 are a convenient structure for securing tie rods 120 to lugs 117, other means may be employed for the stated purpose. The tie rods may be axially preloaded during the repair procedure, all left with some allowance for differential expansion during reactor operation.

The tie rods themselves may be open-ended tubes, rather than solid rods as shown, in order to resist lateral vibration while providing minimum resistance to reactor coolant flow between the shroud and vessel, and providing minimum displacement of water for radiation shielding purposes.

The tie rods serve two primary functions. First, they axially compress the horizontal shroud levels together, even for a worst case horizontal crack extending a full 360° about the shroud. The design basis vertical load capability of the tie rods for this purpose is on the order of 1.5 to 2.0 million pounds, depending upon the actual reactor being repaired. Second, the tie rods prevent lateral shear deflection between shroud levels which could otherwise be free to move laterally due to a 360° circumferential crack fully through the shroud wall thickness. The prevention of lateral shear is effected by compressing the opposite surfaces of the horizontal cracks against one another. The design basis lateral load due to seismic events is approximately 400,000 pounds, depending upon the reactor.

Figure 9:
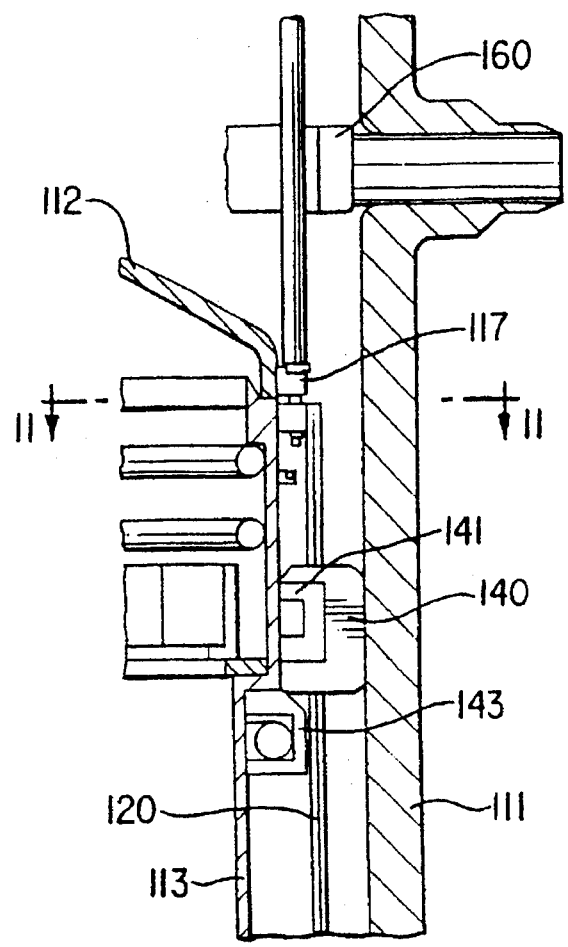
FIG. 9 is a detailed view in broken longitudinal section of portion of a reactor shroud repaired in accordance with another embodiment of the method of the present invention.
Figure 9:
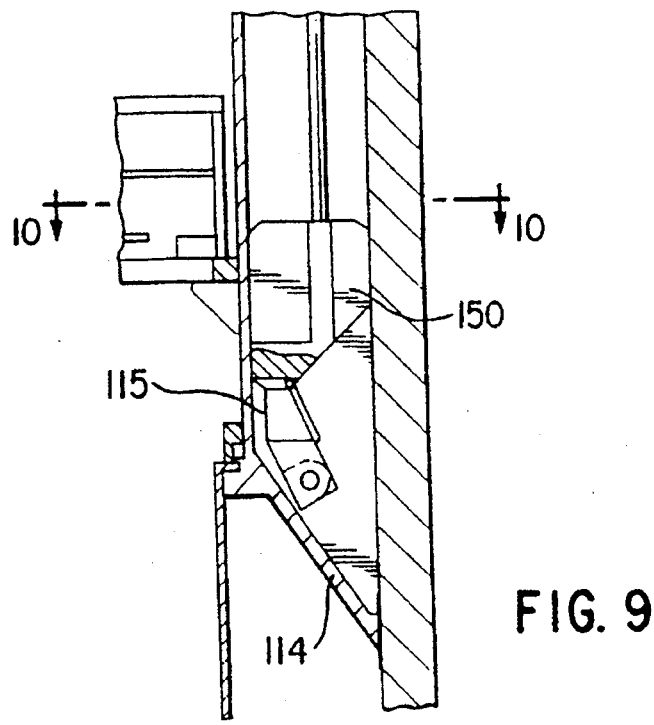
Figure 10:
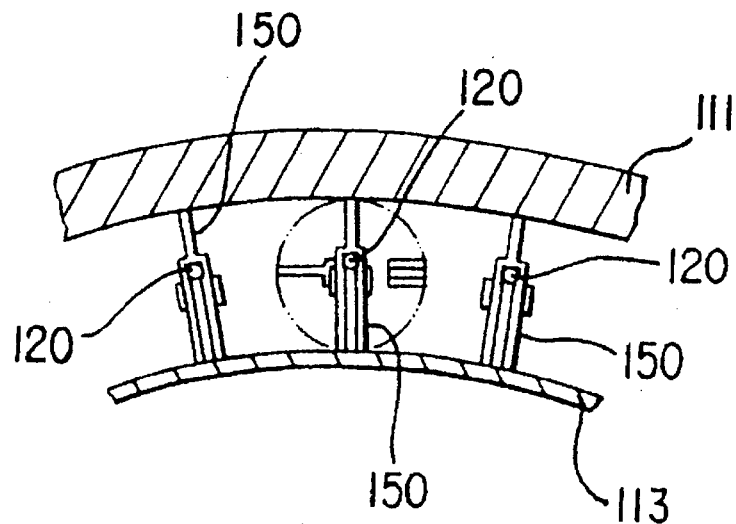
FIG. 10 is a view in section taken along lines 10—10 of FIG. 9.
Figure 11:
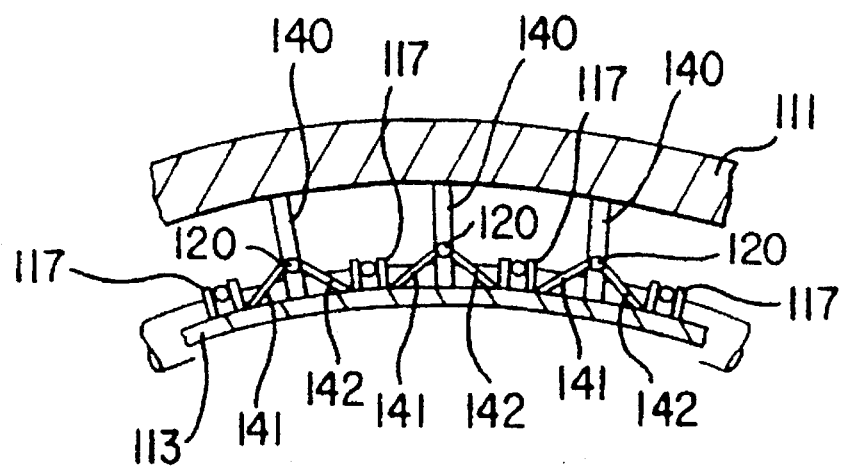
FIG. 11 is a view in section taken along lines 11—11 of FIG. 9.

In the embodiment illustrated in FIGS. 9, 10 and 11, lateral spacers are installed between the inside wall of reactor vessel 111 and the outside wall of shroud 113. Each tie rod 120 has an upper spacer 140 and a lower spacer 150 associated therewith. These spacers serve to resist horizontal seismic loads and hold the shroud in place relative to the vessel wall in the event of cracking along any horizontal weld during a seismic event. Upper spacers 140 are plate-like members disposed in respective radial planes about the shroud axis with their opposite longitudinal edges abutting the shroud and vessel. Each spacer 140 is disposed between a respective pair of lugs 117. Spacer 140 has a pair of angled braces 141, 142 secured to respective spacer surfaces and extending to the junction between the facing lug 117 and shroud 113. Braces 141, 142 may be welded or otherwise secured to spacer 140 and provide stable three-site contact with the shroud surface to resist rotation of the spacer plate out of its radial plane. Each spacer 140 includes a bore extending therethrough from its top edge to its bottom edge to receive and possibly engage tie rods 120. The spacer bore may be threaded to serve as a tightening nut that bears against a protrusion 143 from the upper end of the shroud. Alternatively, the bore may be smooth, requiring a separate tightening nut to apply the axially compressive forces.

Spacer 150 has a bottom portion adapted to be secured to the top of a respective bracket 115 or other engagement structure near the bottom of shroud 113. Engagement may be by means of a hooklike structure or any other suitable means. During insertion of the tie rod assembly, the assembly is rotated such that spacer 150 is perpendicular to its final deployment position. When disposed at the desired vertical location, the assembly is rotated by 90° to cause spacer 150 to be wedged between the shroud and the vessel.

In addition to the horizontal spacers 140, 150, additional spacers may be installed to resist upwardly directed loads. Specifically, such spacers would rest on respective lugs 117 and have upper ends abutting the bottom of feedwater spargers 160 disposed at spaced angular locations above lid 112. Such vertical load spacers would include a beam structure, similar to beam 123, resting atop lugs 117 that are not used to support tie rods 120. The upwardly directed vertical loads resisted by these spacers would be those due to a main stream line break accident. The vertical load spacers hold the shroud down and in place should there be a horizontal crack.

Horizontal and vertical spacers may be installed in any combination and may be utilized with or without tie rods. If tie rods are used in conjunction with horizontal spacers, for example as illustrated in FIGS. 9, 10 and 11, the number of tie rods required to effect the necessary axial loading and render horizontal cracking ineffectual is reduced by approximately half.

Although a variety of different types of attachment of the lower end of the tie rods has been described and illustrated, it should be understood that the method of such attachment is not to be limiting. For example, the lower end of the tie rod can hook onto an existing bracket, be attached to a gusset, or utilize a wedge-type spreading device that automatically wedges itself between the shroud and vessel at the bottom of the shroud, etc.

The repair method described herein utilizes the addition of tie rods and/or horizontal and/or vertical spacers installed in situ when the reactor is shut down. Approximately twenty tie rods are required for a typical installation. Alternatively, or in combination, approximately ten sets of horizontal and/or vertical spacers are utilized in the given installation.

As noted, in most instances the tie rods are secured to existing hardware, although hardware may be added, or other suitable means for engagement may be provided for the tie rods.

The repair method of the present invention has numerous advantageous features. For example, the method accommodates any degree of expected cracking within the stainless steel portion of the shroud, including its support ring. The method is more than adequate for all existing design basis loads including normal loads such as vibration, and accident-related loads such as steam and recirculation line breaks, seismic events, etc. The repair method serves as a permanent repair of the shroud once horizontal cracks are noticed. In addition, the repair installation substantially reduces the need and extent for any future inspections for shroud cracking. The repair method is effected without modification of existing reactor internal equipment and without refueling procedures for most reactors; in some cases some minor additional hardware may be required. Additionally, the method may be performed without any welding required inside the reactor vessel.

From the foregoing description it will be appreciated that the invention makes available a novel method for repairing boiling water reactor shrouds so as to completely overcome any deleterious effects of horizontal of the shroud.

Having described preferred embodiments of a new and improved method for repairing boiling water reactor shrouds in accordance with the present invention, it is believed that other modifications, variations and changes will be suggested to persons skilled in the art in view of the teachings set forth herein. It is therefore to be understood that all such variations, modifications and changes are believed to fall within the scope of the present invention as defined by the appended claims.

What is claimed is:

1. A repaired shroud assembly for a nuclear boiling water reactor comprising a shroud having a substantially cylindrical configuration formed of multiple levels of arcuate plates joined by circumferentially continuous horizontal welds, said shroud having top and bottom structures; and a plurality of tie rods connected between said top and bottom structures at a respective plurality of angularly spaced locations about an exterior of said shroud, each of said tie rods being connected with said top and bottom structures of said shroud in tension to repair said shroud by compressing said plate levels along said horizontal welds to prevent relative lateral movement of said plate levels adjacent cracks along said horizontal welds.

2. A repaired shroud assembly for a nuclear boiling water reactor as recited in claim 1 wherein an upper end of each tie rod is secured to a beam depending from said top structure of said shroud.

3. A repaired shroud assembly for a nuclear boiling water reactor as recited in claim 2 wherein said top structure of said shroud includes a plurality of angularly spaced lugs and said beams are mounted between pairs of said lugs.

4. A repaired shroud assembly for a nuclear boiling water reactor comprising a shroud having a substantially cylindrical configuration formed of a plurality of plates joined by horizontal welds, said shroud having top and bottom structures; and a plurality of tie rods disposed around a periphery of said shroud and connected between said top and bottom structures, each of said tie rods being connected with said top and bottom structures of said shroud in tension to compress said plates along said horizontal welds whereby said tie rods prevent radial displacement of said plates adjacent cracks along said horizontal welds;

wherein said bottom structure of said shroud includes a plurality of angularly spaced brackets and a lower end of each tie rod is secured to a hook configured to engage an underside of one of said brackets.

5. A repaired shroud assembly for a nuclear boiling water reactor as recited in claim 1 wherein said shroud is disposed within a reactor vessel and further comprising a plurality of radial spacers mounted on said tie rods and engaging a wall of said reactor vessel.

6. A repaired shroud assembly for a nuclear boiling water reactor as recited in claim 1 wherein said shroud is disposed within a reactor vessel and further comprising a plurality of radial spacers mounted on said tie rods and extending between said shroud and a wall of said reactor vessel.

* * * * *